(12) United States Patent
Runkle et al.

(10) Patent No.: US 7,664,590 B2
(45) Date of Patent: Feb. 16, 2010

(54) SYSTEM FOR DETECTING IGNITION FAILURE IN A GAS TURBINE ENGINE

(75) Inventors: Mark Andrew Runkle, Schenectady, NY (US); Steven William Backman, Simpsonville, SC (US); Paul David Black, Greenville, SC (US); Mark Andrew Cournoyer, Schenectady, NY (US); Kevin Andrew Spengler, Marietta, GA (US); Daniel D. Morrison, Roswell, GA (US); Robert Joseph Iasillo, Simpsonville, SC (US); Christopher David Miller, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 141 days.

(21) Appl. No.: 12/128,864

(22) Filed: May 29, 2008

(65) Prior Publication Data

US 2008/0228370 A1 Sep. 18, 2008

Related U.S. Application Data

(62) Division of application No. 10/973,482, filed on Oct. 26, 2004, now Pat. No. 7,386,982.

(51) Int. Cl.
*G06F 19/00* (2006.01)
(52) U.S. Cl. ............... 701/100; 701/101; 701/107; 60/39.094
(58) Field of Classification Search ............ 701/100, 701/101, 102, 107; 60/779, 39.094
See application file for complete search history.

(56) References Cited

U.S. PATENT DOCUMENTS

| 3,774,394 | A | | 11/1973 | Criffield |
| 3,808,796 | A | | 5/1974 | Spears, Jr. |
| 5,103,629 | A | * | 4/1992 | Mumford et al. ............ 60/778 |
| 5,996,938 | A | | 12/1999 | Simonetti |

* cited by examiner

*Primary Examiner*—Gertrude Arthur Jeanglaud
(74) *Attorney, Agent, or Firm*—Armstrong Teasdale LLP

(57) ABSTRACT

A method of operating a gas turbine engine is provided. The method includes introducing a fuel into a combustor, detecting a failure of ignition of the fuel, and preventing ignition until the introduced fuel is substantially removed from the gas turbine engine.

12 Claims, 3 Drawing Sheets

SYSTEM FOR DETECTING IGNITION FAILURE IN A GAS TURBINE ENGINE

CROSS-REFERENCE TO RELATED APPLICATIONS

This application is a divisional of U.S. patent application Ser. No. 10/973,482, filed Oct. 26, 2004 now U.S. Pat. No. 7,386,982, which is hereby incorporated by reference and is assigned to the assignee of the present invention.

BACKGROUND OF THE INVENTION

This invention relates generally to gas turbine engines, and more particularly, to methods and systems for controlling the operation of gas turbine engines.

At least some known gas turbine engines include a compressor section, a combustor section, and at least one turbine section. The compressor compresses air, which is mixed with fuel and channeled to the combustor. The mixture is then ignited generating hot combustion gases. The combustion gases are channeled to the turbine which extracts energy from the combustion gases for powering the compressor, as well as producing useful work to power a load, such as an electrical generator, or to propel an aircraft in flight.

To start the engine, it is rotated to a predetermined speed, fuel is introduced, and an ignitor is energized. Sometimes the gas turbine engine fails to start properly, and/or the flame in the gas turbine engine may be inadvertently extinguished. In either case, some liquid fuel, which is not burned, may remain in the gas turbine engine. In addition, when an engine is shutdown, it is possible for some of the fuel supplied to the engine to remain unburned and accumulate in low-points in the engine. However, unburned accumulated fuel within the engine may pose a hazard during subsequent starting of the gas turbine engine, because the left-over unburned fuel may ignite with the fuel supplied to the combustor during engine starting, thus providing an excessive amount of energy to the combustor and other parts of the gas turbine engine that may result in damage to such components.

BRIEF DESCRIPTION OF THE INVENTION

In one aspect, a method of operating a gas turbine engine is provided. The method includes introducing a fuel into a combustor, detecting a failure of ignition of the fuel, and preventing ignition until the introduced fuel is substantially removed from the gas turbine engine.

In another aspect, a gas turbine system is provided. The system includes a gas turbine engine that includes a combustor section and a turbine section, a drain line coupled to a low-point of at least one of the combustor section and the turbine section, a control system configured to receive a signal indicative of a failure of ignition of the combustor section, and prevent ignition of the combustor section until fuel introduced to the gas turbine engine is substantially removed from the gas turbine engine.

In yet another aspect, a computer program embodied on a computer readable medium for controlling a gas turbine engine system wherein the system includes a gas turbine engine that includes at least one combustor can. The computer program includes a code segment that receives user selection input data and then instructs the system to filter a gas turbine engine signal indicative of combustion in at least one of the combustor cans to only pass a portion of the signal that is between at least one of approximately ten Hz to approximately twenty five Hz, approximately eighty Hz to approximately one hundred and twenty Hz, and approximately one hundred thirty Hz to approximately one hundred sixty Hz, compare the filtered signal to a predetermined lean blowout threshold, and control the gas turbine engine system to facilitate reducing a probability of a lean blowout event using the comparison.

DETAILED DESCRIPTION OF THE INVENTION

While the methods and systems are herein described in the context of a gas turbine engine used in an industrial environment, it is contemplated that the methods and systems described herein may find utility in other combustion turbine systems applications including, but not limited to, turbines installed in aircraft, watercraft, and land vehicles. In addition, the principles and teachings set forth herein are applicable to gas turbine engines using a variety of combustible fuels such as, but not limited to, gasoline, kerosene, diesel fuel, and jet fuel. The description hereinbelow is therefore set forth only by way of illustration, rather than limitation.

Figure 1:
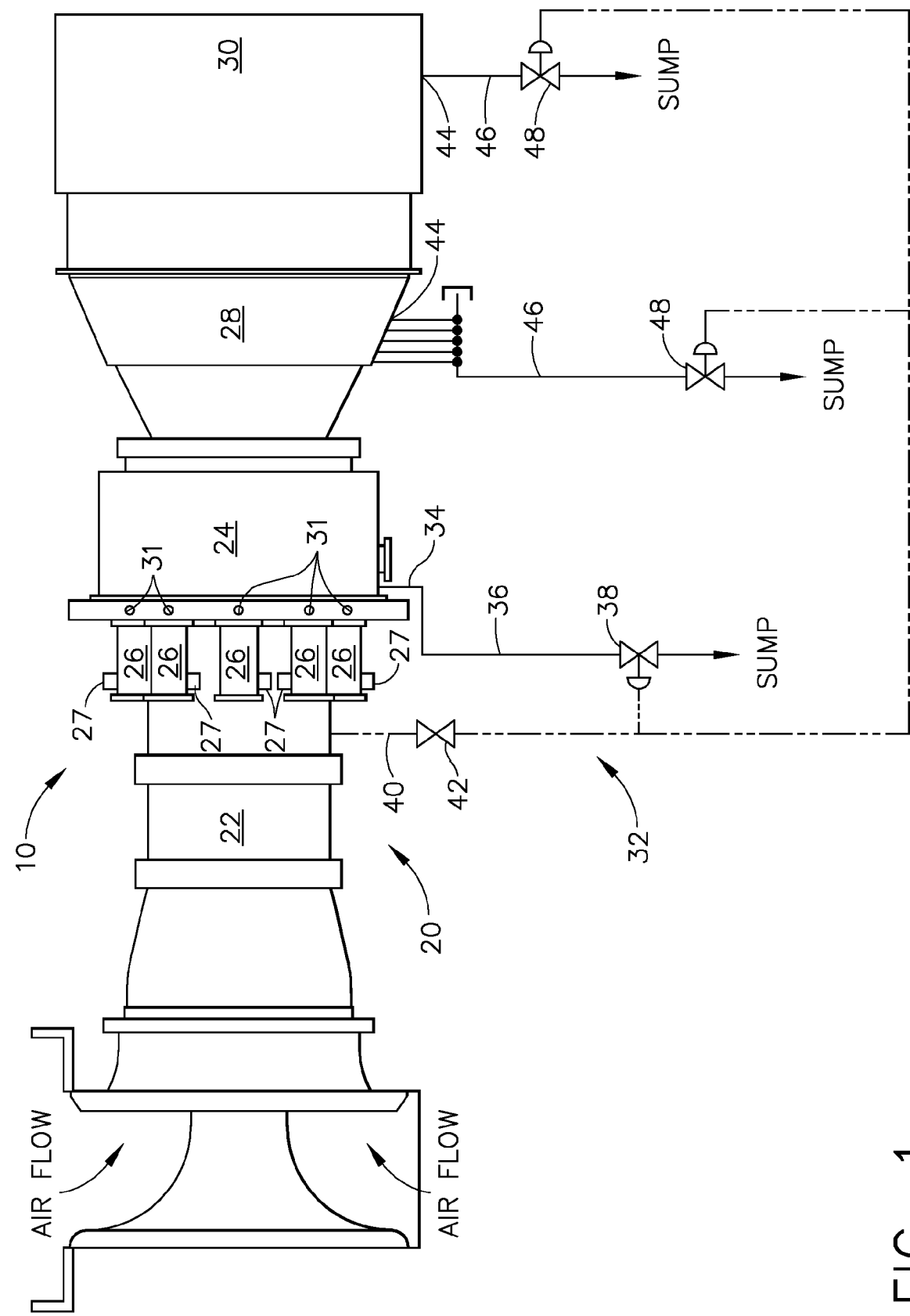
FIG. 1 is a side view of a gas turbine system that includes a gas turbine.

FIG. 1 is a side view of a gas turbine system 10 that includes a gas turbine engine 20. Gas turbine engine 20 includes a compressor section 22, a combustor section 24 including a plurality of combustor cans 26 and an associated ignition system 27, and a turbine section 28 coupled to compressor section 22 via a shaft (not shown). An exhaust section 30 channels exhaust gases from gas turbine engine 20 downstream to a component (not shown), such as, for example, an exhaust stack and/or a heat recovery steam generator. One or more flame detectors 31 are coupled to combustor section 24 and/or combustors cans 26 to facilitate determining a state of combustion within each combustor can 26, or a grouping of combustor cans 26.

In operation, ambient air is channeled into compressor section 22 wherein the ambient air is compressed to a pressure greater than the ambient air. The compressed air is then channeled into combustor section 24 wherein the compressed air and a fuel are combined to produce a relatively high-pressure, high-velocity gas. Turbine section 28 extracts energy from the high-pressure, high-velocity gas discharged from combustor section 24, and the combusted fuel mixture is used to produce energy, such as, for example, electrical, heat, and/or mechanical energy. In one embodiment, the combusted fuel mixture produces electrical energy measured in kilowatt-hours (kWh). However, gas turbine system 10 is not limited to the production of electrical energy and encompasses other forms of energy, such as, mechanical work and heat. Gas turbine system 10 is typically controlled, via various control parameters, from an automated and/or electronic control system (not shown) that is attached to gas turbine system 10.

Gas turbine engine 20 also includes a false start fuel drain system 32 that includes a plurality of low-point drains, interconnecting piping, and control valves. In the exemplary embodiment, combustor section 24 includes a single low-point drain 34 that is coupled through piping 36 to a valve 38. In the exemplary embodiment, low-point drain 34 is coupled to an interior of combustor section 24, although it should be noted that a location of low-point drain 34 is selected based on experience, design, and/or other factors to ensure that residual fuel is collected. Low-point drain 34 maintains a slope, inclined away from the connection to combustor section 24 to facilitate reducing traps that can collect residual fuel. Low-point drain 34 is sized to permit a predetermined flow rate of residual fuel to exit combustor section.

Fuel collected at low-point drain 34 is drained through piping 36 and valve 38 to a sump (not shown) wherein the fuel may be periodically sampled and transferred to a fuel tank, waste tank, and/or other disposal means. In the exemplary embodiment, valve 38 is controlled by discharge pressure from compressor section 22 and is configured to fail in an open position. Valve 38 may biased to the open position by, for example, a spring, and includes a pneumatic type actuator that converts compressor discharge pressure to a valve motive force that opposes the biasing spring. In an alternative embodiment, valve 38 may be controlled by other types of actuators, such as, but, not limited to a manual actuator, a motor actuator, a pneumatic actuator, a solenoid actuator, and a hydraulic actuator. Compressor discharge pressure may be supplied to valve 38 through piping 40 and valve 42. Valve 42 limits the compressor discharge pressure supplied to the actuator of valve 38.

False start fuel drain system 32 may also include at least one low-point drains 44 coupled to turbine section 28 and/or exhaust section 30. In the exemplary embodiment, low-point drains 44 are configured similarly to low-point drain 34, such that each low-point drain 44, or grouping of a plurality of low-point drains 44, are coupled to the sump through a respective piping 46 and through respective valves 48. Each of the respective valves 48 may be controlled in unison with valve 38, or may be controlled independently of each other false start fuel drain system valve 48.

During a starting sequence, false start fuel drain system valves 38 and 48 may be controlled to an open position. A driver may be energized to initiate rotation of a rotor (not shown) within gas turbine engine 20. At a predetermined rotor speed, ignition system 27 is energized and fuel is supplied to at least one combustor can 26. Ignition system 27 provides ignition energy to the fuel supplied into combustor cans 26. Flame detectors 31 monitor the combustion status of the fuel and if the fuel does not ignite within a predetermined time period, the starting sequence is aborted. During the starting sequence, false start fuel drain system valves 38 and 48 may have been operated to a closed position. Specifically, false start fuel drain system valves 38 and 48 may be closed during a starting sequence to facilitate avoiding a performance penalty due to gas bleed and/or combustor instability. When a starting sequence is aborted, fuel is shutoff from entering gas turbine engine 20, ignition energy to gas turbine engine 20 is removed, and the rotor is permitted to coast to a predetermined rotational speed.

A restart of the starting sequence after a false start may be permitted only after certain predetermined conditions are met. One such condition may be a removal of residual fuel that was supplied to gas turbine engine 20 during the false start. Residual fuel is removed to ensure a known quantity of fuel is available during a subsequent restart. Fuel supplied during the false start may be of an unknown quantity, and the residual fuel may have collected in locations that may make calculation of the amount of energy available during a subsequent starting sequence difficult and/or uncertain. An excess of energy may cause gas turbine engine components to exceed design ratings, resulting in a failure of at least some of the gas turbine engine components, and/or a requirement to disassemble gas turbine engine 20 for an inspection. Residual fuel may be drained under pressure from combustor section 24, if draining is permitted during rotor coastdown, or the residual fuel may be gravity drained.

Successful removal of residual fuel from gas turbine engine 20 after a false start may be a manual process that may be verified by an operator. After determining that false start fuel has been removed from gas turbine engine 20, the operator may provide an input to a gas turbine engine control system (not shown in FIG. 1). Such an input may be from a reset pushbutton located near gas turbine engine 20, a control logic input from a computer input, such as a keystroke entry or a computer mouse-driven selection. Additionally, any other computer or control system input method may also be used, such as a voice command, that facilitates input to the gas turbine engine control system. Successful removal of residual fuel from gas turbine engine 20 may also be facilitated by a level detection system, or a time delay of a predetermined length that allows sufficient time for substantially all fuel to be drained from gas turbine engine 20. The time delay may be calculated based on known parameters, such as a measurement of the amount of fuel supplied during the false start, flow characteristics of the fuel, and a geometry of the false start fuel drain system piping and accoutrements. Other conditions may be required to be met prior to permitting a gas turbine engine restart, such as rotor coastdown to a predetermined speed.

Figure 2:
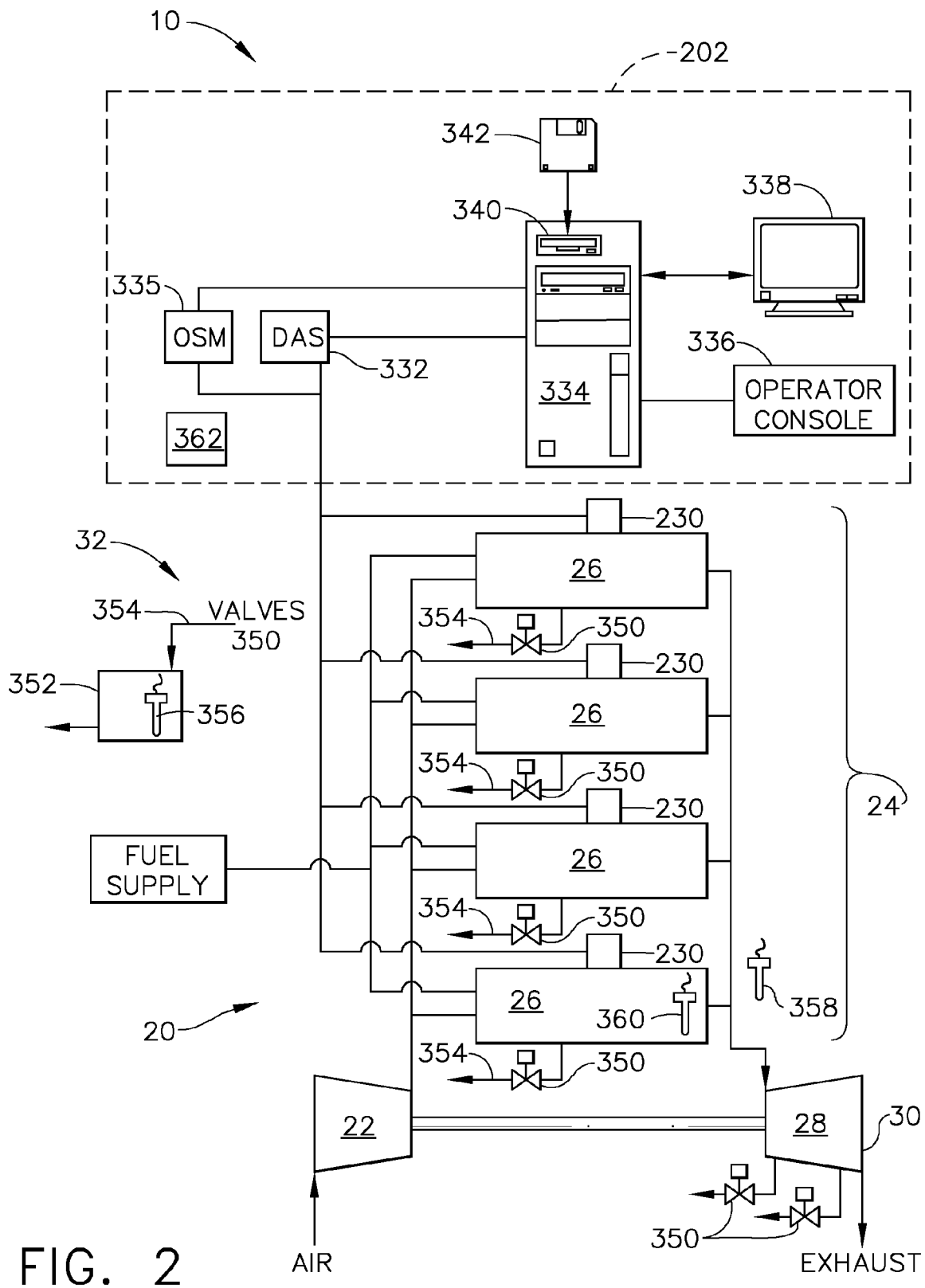
FIG. 2 is a simplified schematic illustration of the gas turbine system shown in FIG. 1.

FIG. 2 is a simplified schematic illustration of gas turbine system 10 shown in FIG. 1. In the exemplary embodiment, gas turbine system 10 includes on-line gas turbine engine control system 202 that includes a data acquisition system (DAS) 332 that samples data from sensors 230 for subsequent processing. A computer 334 receives the sampled sensor data from DAS 332 and an onboard system monitor (OSM) 335, and performs high-speed data analysis. Although only four combustor cans 26 are shown, it should be realized that gas turbine engine 20 may include more or less than four combustor cans 26, for example, in one exemplary embodiment, gas turbine engine 20 includes twenty four combustor cans 26.

Computer 334 receives commands from an operator via a keyboard 336. An associated monitor 338 such as, but not limited to, a liquid crystal display (LCD) and a cathode ray tube, allows the operator to observe data received from computer 334. The operator supplied commands and parameters are used by computer 334 to provide control signals and information to DAS 332 and OSM 335. Although illustrated as individual components, it should be realized that computer 334, DAS 332, and OSM 335 may also be resident in the same device.

In one embodiment, computer 334 includes a device 340, for example, a floppy disk drive, CD-ROM drive, DVD drive, magnetic optical disk (MOD) device, or any other digital device including a network connecting device such as an Ethernet device for reading instructions and/or data from a computer-readable medium 342, such as a floppy disk, a CD-ROM, a DVD or another digital source such as a network or the Internet, as well as yet to be developed digital means. In another embodiment, computer 334 executes instructions stored in firmware (not shown). Computer 334 is programmed to perform functions described herein, and as used herein, the term computer is not limited to just those integrated circuits generally known as computers, but broadly refers to computers, processors, microcontrollers, microcomputers, programmable logic controllers, application specific integrated circuits, and other programmable circuits, and these terms are used interchangeably herein. Additionally, although the herein described methods and systems are described in an industrial setting, it is contemplated that the benefits of the invention accrue to non-industrial systems such as those systems typically employed in a transportation setting such as, for example, but not limited to, aircraft.

In the exemplary embodiment, gas turbine system 10 includes false start fuel drain system 32, that includes drain valves 350 configured to drain low-points of combustor section 24 including combustor cans 26, turbine section 28, and exhaust section 30. Valves 350 may be operable as described above to drain fuel supplied to combustor cans 26 during a false start. The fuel draining from gas turbine engine 20 through valves 350 may be directed to sump 352 through one or more piping sections 354. Sump 352 may include a sump level detector 356 that senses a level in sump 352 and generates a respective output signal, which may be transmitted to gas turbine engine control system 202. Combustor section 24 may include a level detector 358 and/or each combustor can 26 may include a level detector 360 to determine presence of false start fuel in combustor section 24 and combustor cans 26. A time delay relay 362 may be embodied in a separate component or may be incorporated into software or firmware executing on gas turbine engine control system 202.

Figure 3:
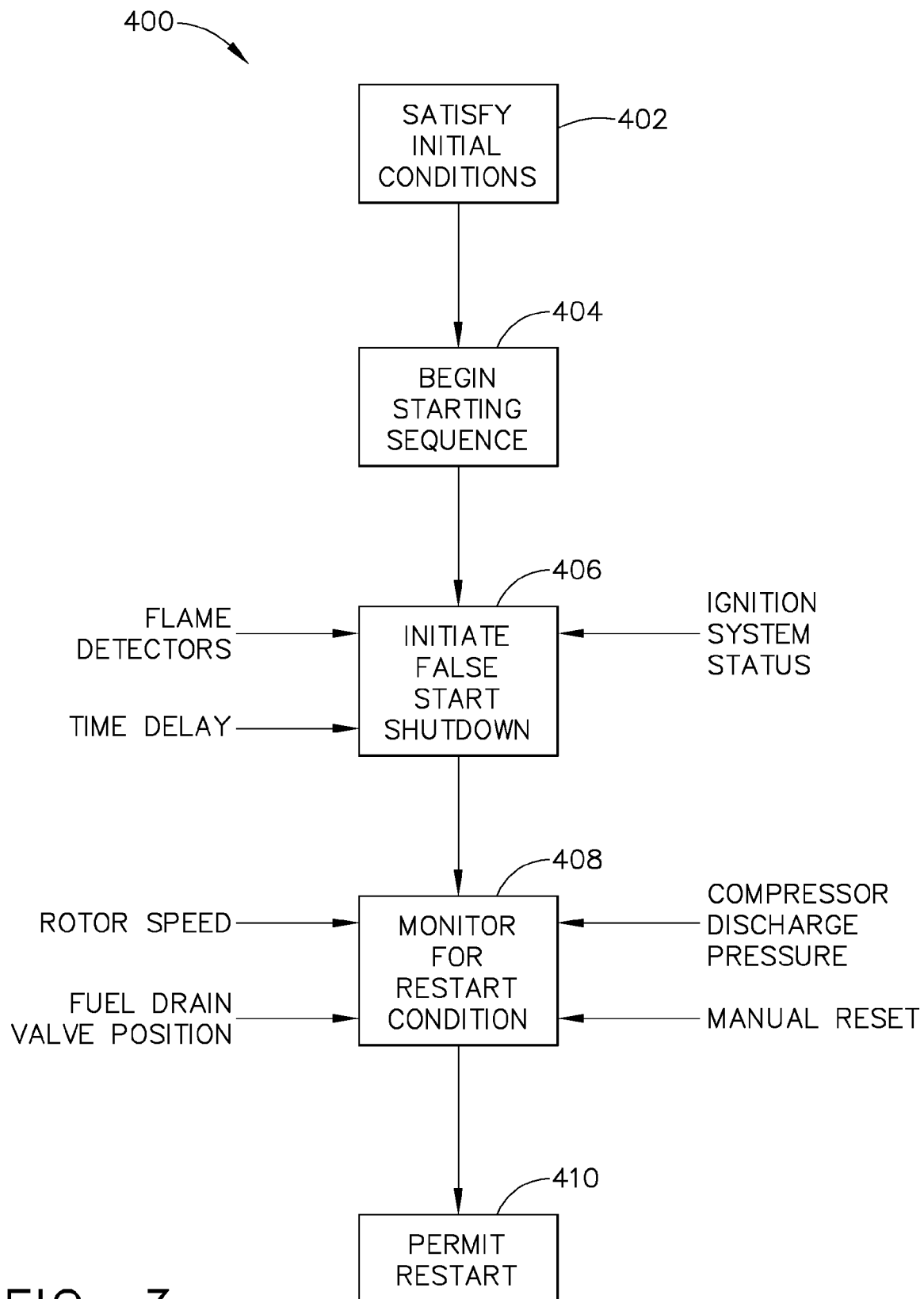
FIG. 3 is a flow chart of an exemplary method of controlling the operation of gas turbine system shown in FIG. 1.

FIG. 3 is a flow chart of an exemplary method 400 of controlling the operation of gas turbine system 10 (shown in FIG. 1). Method 400 includes satisfying 402 initial conditions for starting gas turbine engine 20. Such initial conditions may include lining up piping system valves in a startup lineup, calibrating instruments and detectors that provide inputs to turbine engine control system 202, energizing equipment such as, lubricating oil pumps, fans, emissions monitoring and control systems, and other support systems that facilitates the operation of gas turbine engine 20. When the initial conditions are satisfied 402, a starting sequence may begin 404. The starting sequence may be fully automatic in that no significant operator action is required to start gas turbine engine 20. The starting sequence may be only partially automatic in that the operator may be required to perform at least some manual actions to facilitate the starting sequence. The starting sequence may be automatically initiated, such as by turbine engine control system 202 detecting a condition wherein as turbine engine control system 202 is programmed to start gas turbine engine 20, for example, after a loss of normal power supply. The starting sequence may also be manually initiated at the direction of an operator.

During the starting sequence, turbine engine control system 202 may detect a false start of gas turbine engine 20. As used herein, a false start, is defined as introducing fuel into gas turbine engine 20 that does not begin self sustaining combustion within a predetermined period of time. Turbine engine control system 202 may initiate a false start shutdown 406 that secures the flow of fuel to gas turbine engine 20, secures the rotor driver, and secures ignition system 27. Other actions may also be initiated by turbine engine control system 202 to prepare gas turbine engine 20 for a subsequent starting sequence. Turbine engine control system 202 may use inputs from flame detectors 31, time delay 362, and a status of ignition system 27.

To prevent a restart of gas turbine engine 20, turbine engine control system 202 may lockout controls that would permit a restart of gas turbine engine 20, such that predetermined conditions may need to be achieved before turbine engine control system 202 permits a restart. Accordingly, turbine engine control system 202 monitors 408 inputs to determine when conditions permit a restart of gas turbine engine 20. Turbine engine control system 202 may determine the rotor speed during coastdown by direct measurement using, for example, an eddy current probe or other method, or by determining the rotor speed from compressor discharge pressure. Turbine engine control system 202 may monitor fuel drain valve position to determine that fuel supplied into gas turbine engine 20 during the false start is being drained from gas turbine engine 20. The fuel drain valve position may be only one of open position and closed position, or both. Input to turbine engine control system 202 of both open and closed valve position permits turbine engine control system 202 to determine stuck and sluggish valve conditions. Turbine engine control system 202 may also monitor for a manual reset input provided by an operator that indicates that a manual inspection of gas turbine engine 20 was conducted and that the false start fuel has been determined to be substantially removed from gas turbine engine 20. After turbine engine control system 202 determines that the predetermined conditions for restart of gas turbine engine 20 have been met, turbine engine control system 202 may transmit a restart permit 410 signal to permit a subsequent starting sequence to be initiated.

The above-described methods and systems provide a cost-effective and reliable means for monitoring and controlling a gas turbine engine. More specifically, the methods facilitate determining that residual fuel has been removed from the gas turbine engine before permitting a restart of the gas turbine engine. As a result, the methods and systems described herein facilitate gas turbine engine operation in a cost-effective and reliable manner.

Exemplary methods and systems for monitoring and controlling combustion dynamics of a gas turbine engine are described above in detail. The systems illustrated is not limited to the specific embodiments described herein, but rather, components of each may be utilized independently and separately from other components described herein. Each system component can also be used in combination with other system components.

A technical effect of the methods and systems described herein is to provide a system that monitors gas turbine engine conditions to permit a gas turbine engine restart when substantially all of the residual fuel has been removed from the gas turbine engine.

While the invention has been described in terms of various specific embodiments, those skilled in the art will recognize that the invention can be practiced with modification within the spirit and scope of the claims.

What is claimed is:

1. A computer program embodied on a computer readable medium for controlling a gas turbine engine system, said system comprising a gas turbine engine that includes a combustor section and a turbine section, said computer program comprising a code segment that receives gas turbine engine system input data and then instructs said system to:
    monitor said input data for a failure of ignition of a fuel introduced to said combustor section; and
    prevent ignition until the introduced fuel is substantially removed from the gas turbine engine.

2. A computer program in accordance with claim 1 further comprising a code segment that determines the failure of fuel ignition using a flame detector.

3. A computer program in accordance with claim 1 further comprising a code segment that prevents energization of an ignitor.

4. A computer program in accordance with claim 1 further comprising a code segment that determines if the introduced fuel is removed from the gas turbine engine.

5. A computer program in accordance with claim 1 further comprising a code segment that at least one of opens a drain path from the gas turbine engine and receives a signal indicative of a substantial absence of fuel in the gas turbine engine.

6. A computer program in accordance with claim 5 further comprising a code segment that opens at least one fuel drain valve using a gas turbine engine compressor discharge pressure.

7. A computer program in accordance with claim 5 further comprising a code segment that opens at least one fuel drain valve using a valve actuator.

8. A computer program in accordance with claim 5 further comprising a code segment that opens at least one fuel drain valve upon detection of a failure of ignition.

9. A computer program in accordance with claim 8 further comprising a code segment that automatically opens at least one fuel drain valve.

10. A computer program in accordance with claim 5 further comprising a code segment that receives a signal indicative of a position state of the at least one fuel drain valve.

11. A computer program in accordance with claim 10 further comprising a code segment that:
 receives a first signal indicative of a closed position state of the at least one fuel drain valve;
 receives a second signal indicative of an open position state of the at least one fuel drain valve; and
 diagnoses at least one of a stuck valve condition and a sluggish valve condition using the first and second signals.

12. A computer program in accordance with claim 5 further comprising a code segment that at least one of receives a signal indicative of a completed manual inspection of the gas turbine engine, receives a signal indicative of a predetermined length of time sufficient for fuel to drain from the gas turbine engine, and receives a signal indicative of a level of fuel in the gas turbine engine.

* * * * *